Patented Nov. 7, 1939

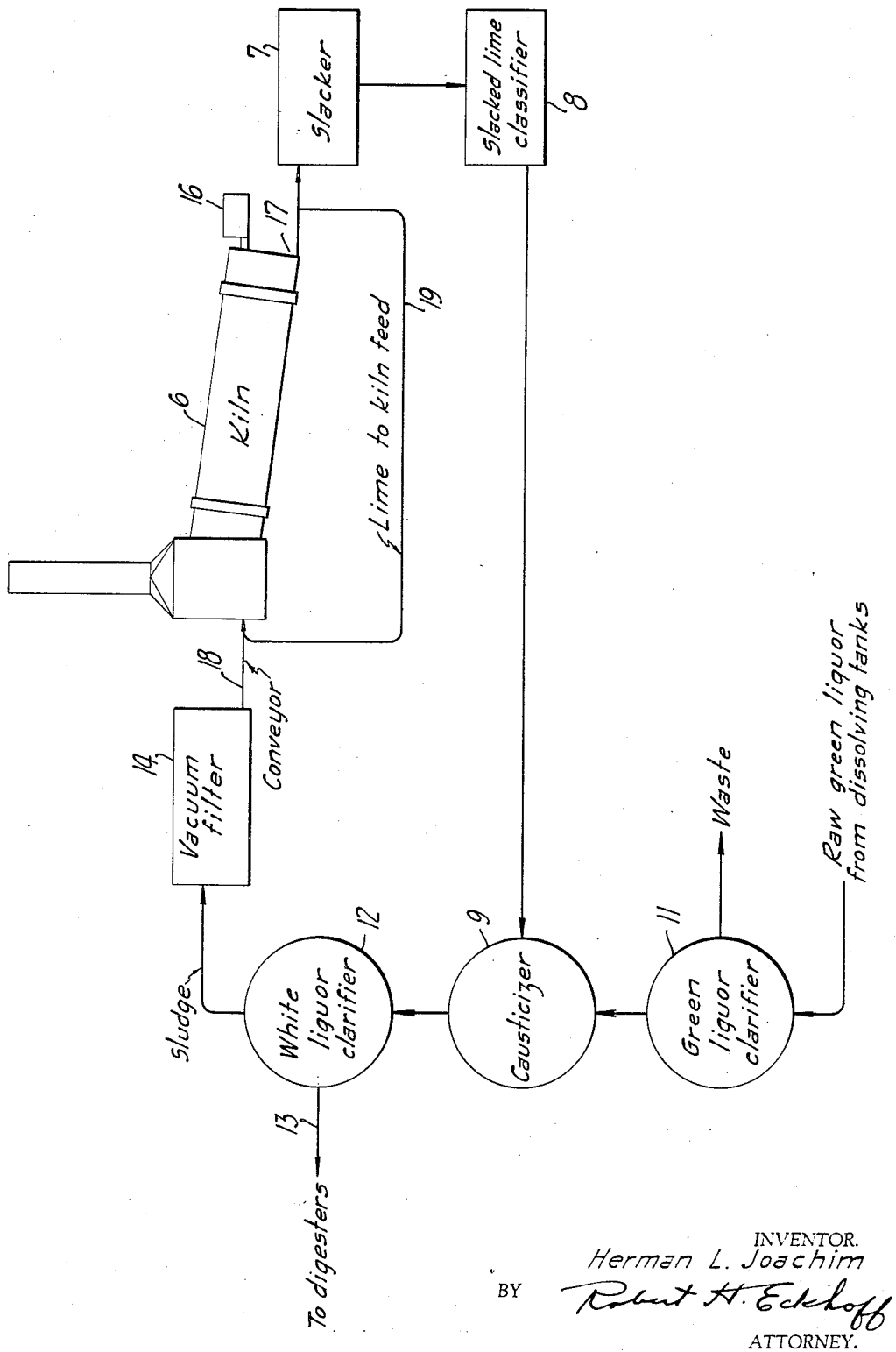

2,178,586

UNITED STATES PATENT OFFICE 2,178,586

RECOVERY OF LIME SLUDGE

Herman L. Joachim, San Francisco, Calif.

Application February 21, 1938, Serial No. 191,837

6 Claims. (Cl. 23—186)

This invention relates to improvements in the conversion of the lime sludge formed upon causticizing of alkaline digestion liquors employed in the pulping of wood and other vegetable fiber bearing materials.

Economical operation of the alkaline pulping processes requires recovery of the sodium salts used in the cooking or digestion operation. Accordingly, the organic compounds of sodium formed in the digestion operation are converted in suitable furnaces to sodium carbonate. The last step in the recovery of the pulping chemicals is the causticizing of the so formed carbonate. The green liquor, either that from soda or from the sulphate process, is treated with calcium hydrate made by slaking quicklime according to the reaction:

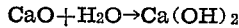

$$CaO + H_2O \rightarrow Ca(OH)_2$$

The quicklime remains the active element and the entire reaction can be represented thus:

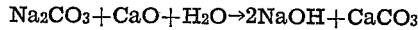

$$Na_2CO_3 + CaO + H_2O \rightarrow 2NaOH + CaCO_3$$

Of course, the liquor contains other chemicals in addition to the carbonate, but the causticizing reaction does not affect these and we are here concerned with recovery of the calcium carbonate sludge.

It is the usual practice to calcine the carbonate in the form of a sludge. This operation is ordinarily carried on in a suitable furnace as a rotary kiln or a Herreshoff furnace. Now it has been my observation that frequently, far too frequently, accretions of materials form within the furnace into rings, for example, in a kiln, which hinder the passage of the material, building up until if the rings cannot be destroyed by other means the furnace must be stopped, cooled, and the accretions broken up with suitable tools. In some instances, the rings are shot at with high powered rifles in an attempt to break them up in their initial stages. In other instances, mechanical pokers or stokers are employed in an effort to break up the accretions.

Accretion formation is also objectionable because it means a loss in the output of the furnace. The material forming the ring or accretions is usually so fused together that it is necessary to separate it and discharge it to waste.

In accordance with this invention, I have discovered that by pretreating the lime sludge prior to calcining accretion formation can be prevented. As to the cause of this formation, I cannot say definitely. It may well be that some impurities carried in the lime sludge from the causticizing operation on the digestion liquor provide slag-forming materials at certain stages in the calcining operation. In any event, whatever be the reason for the formation, I have discovered how this can be prevented and hereinafter I will disclose the present preferred maner of practicing my invention.

In the drawing accompanying and forming a part hereof, the figure is a diagrammatic representation of my invention and its application to the causticizing of digestion liquors.

Referring to the drawing, quicklime is delivered from a kiln indicated at 6 to slaker 7 wherein it is slaked. The slaked lime is then run into a classifier 8 from which it is run into a causticizer 9 wherein it is mixed with clarified green liquor from green liquor classifier 11. In causticizer 9 the causticizing reaction is continued until the sodium carbonate in the clarified liquor is converted to sodium hydroxide and the slaked lime is converted to calcium carbonate in the form of a sludge. The sludge is then separated from the digestion liquor in white liquor clarifier 12, the white liquor being run to the digester, as indicated by line 13. The calcium carbonate sludge is washed and filtered in a vacuum filter 14 wherein the final water content is reduced to about 50%. This sludge is then calcined in a suitable furnace as kiln 6.

The kiln is of the usual countercurrent type wherein a burner 16 is operated at the outlet end 17 of the kiln. The kiln includes a drying zone, a heating zone, a calcining zone, and a burning zone.

Now it has been the observation of those skilled in the art that, in the calcination of this calcium carbonate sludge as aforesaid, accretions form in the kiln in the shape of rings. In accordance with this invention the calcium carbonate sludge is mixed with some of the quicklime produced in the kiln prior to entrance of the sludge into the kiln. Thus, as is indicated in the drawing, calcium carbonate sludge from the filter is fed by a suitable conveyor 18 as a screw conveyor. Quicklime from the kiln outlet is passed through feed line 19 to mix with sludge in the screw conveyor which serves as a mixer. The quicklime is slaked by water in the sludge. This serves two ends. First, it preheats the sludge. Second, it causes bulking, increasing the volume per cubic foot of the feed to the kiln, the quicklime slaking in the sludge to form a loose fluffy hydrate therein. It will be found that by combining the calcium carbonate sludges in a suitable proportion accretion formation in the kiln can be successfully eliminated. I have found that by mixing a sludge in the proportion of 2000 pounds of the sludge to 200–250 pounds of the CaO and by intermixing these, accretion formation can be successfully avoided in the case of a soda and sulfate process digestion liquor.

While I prefer to use quicklime, bulking and preheating can be effected by other means. For example, sawdust added to the sludge feed through the screw conveyor acts to bulk the feed while preheating of the feed is secured by passing stack gases from the kiln to preheat the feed. The sawdust burns out in the kiln after it has served its end, increasing the bulk of the kiln feed. By adding sawdust, the bulk of the sludge is increased; about 400 pounds of sawdust per ton of sludge suffices. The degree of preheat can vary but a temperature of 175° F. usually suffices. Other materials can be employed to secure bulking but a woody substance has the advantage of burning out in the kiln.

I claim:

1. The process of recovering the values in an aqueous lime sludge formed in causticizing a digestion liquor comprising mixing said sludge with calcium oxide to hydrate said oxide and form a loose fluffy hydrate in said sludge, increasing the volume of said sludge, and then calcining said sludge to convert substantially all calcium carbonate and calcium hydrate therein to calcium oxide.

2. The improvement in conversion of a wet calcium carbonate sludge to calcium oxide which includes adding sufficient reactive calcium oxide to the wet sludge to hydrate said oxide in said sludge and form a loose fluffy hydrate therein which preheats and bulks the sludge prior to calcination of said sludge and calcining the so bulked sludge.

3. The improvement in conversion, by calcination, of a wet calcium carbonate sludge to calcium oxide which consists in adding sufficient calcium oxide to the wet sludge to bulk and preheat the sludge upon hydration of the oxide by the wet sludge to form in said sludge a loose and fluffy hydrate.

4. The improvement in conversion, by calcination, of a wet calcium carbonate sludge carrying about 50% water to calcium oxide which consists in adding about 10% by weight of calcium oxide to the wet sludge to bulk and preheat the sludge upon hydration of the oxide by the wet sludge.

5. The process of recovering the values in an aqueous lime sludge formed in causticizing a digestion liquor comprising mixing about 10 parts by weight of said sludge with one part by weight of unslaked calcium oxide to hydrate said oxide in an intimate mixture with said sludge and preheat said sludge, and then calcining the so preheated sludge to convert substantially all calcium carbonate and calcium hydrate therein to calcium oxide.

6. The improvement in conversion, by calcination, of a wet calcium carbonate sludge to calcium oxide which consists in adding about 200 pounds of calcium oxide to about 2000 pounds of the wet sludge to bulk and preheat the sludge upon hydration of the oxide by the wet sludge.

HERMAN L. JOACHIM.